Feb. 6, 1968 T. L. HUANG 3,368,154

STAIRCASE WAVE GENERATOR

Filed Aug. 7, 1964

INVENTOR:
THOMAS L. HUANG,

BY

HIS ATTORNEY.

United States Patent Office 3,368,154
Patented Feb. 6, 1968

3,368,154
STAIRCASE WAVE GENERATOR
Thomas L. Huang, Syracuse, N.Y., assignor to General Electric Company, a corporation of New York
Filed Aug. 7, 1964, Ser. No. 388,223
3 Claims. (Cl. 328—186)

ABSTRACT OF THE DISCLOSURE

A staircase wave generator in which a plurality of resistances are connected across a source of unidirectional potential. Each resistance includes an intermediate point corresponding to a respective level of the staircase wave. Each of the intermediate points is connected to a ground reference by conduction of a respective voltage controlled breakdown device connected between the point and the ground reference except when the device is periodically rendered nonconductive. The devices are rendered nonconductive in sequence.

This invention relates to a staircase wave generator generally and more particularly, to a staircase wave generator utilizing silicon controlled rectifiers in the wave forming circuit.

In the past, staircase wave generators have been formed by utilizing capacitor charge or discharge through a low resistance element to obtain the voltage levels involved in the steps of the staircase wave form. Because the voltage across the capacitor varies exponentially as the capacitor is charged or discharged, it was impossible to obtain voltage steps of equal height. This disadvantage consistently plagued the users of staircase wave generators formed from capacitive elements.

To escape the variation in voltage levels resulting from the exponential charge and discharge of capacitors, voltage controlled breakdown devices came into use as switching elements to accurately control an output voltage level. However, to provide a staircase wave form, it was necessary to have a means to accurately fire and reset each of the breakdown devices at a prescribed time in the cycle. This meant that fairly complex circuitry had to be utilized to accurately control the breakdown devices and the circuitry was such that component deviations could radically affect the circuit operation.

In order to overcome the expense involved in these complicated circuits and to provide a much more rugged and less sensitive arrangement, the present invention utilizes a simplified circuit for simultaneously firing each of the breakdown devices and providing relatively simple circuit means for accurately resetting the devices in a desired sequence. Such a circuit provides a staircase wave form with accurately controlled voltage levels, but eliminates the necessity of using expensive and complicated circuitry for providing accurate sequential firing of the breakdown devices.

Therefore, it is an object of this invention to provide an improved staircase wave generator.

Another object of this invention is to form a voltage controlled breakdown device staircase wave generator producing an output having uniform voltage steps.

A further object of this invention is to provide a voltage controlled breakdown device staircase wave generator having a decreased number of components and simplified circuitry.

Still another object of this invention is to provide a voltage controlled breakdown device staircase wave generator which does not require extensive external circuitry to provide the desired sequential operation.

Yet another object of this invention is to provide a staircase wave generator which produces gating pulses of a uniform magnitude in synchronization with each voltage level of the staircase wave form.

Other objects and advantages of this invention will become apparent as the following description proceeds and the features of novelty which characterize the invention will be pointed out with particularity in the claims annexed to and forming part of this specification.

Briefly, in one embodiment thereof, this invention involves placing voltage controlled breakdown devices, such as silicon controlled rectifiers (SCR's), in parallel with each other. The number of SCR's, and hence the number of parallel paths, depends upon the number of steps that are desired in the staircase wave form. A unijunction relaxation oscillator circuit produces a series of uniformly spaced firing pulses which are simultaneously applied to each of the SCR's to promote conduction thereof. During conduction of the SCR's the output voltage of the generator is at its minimum value. To obtain the first step or highest voltage level, a first SCR is reset or placed in a nonconductive state. Resetting of the first SCR is achieved by the utilization of a second unijunction transistor relaxation oscillator circuit which produces a reset pulse after a desired number of firing pulses have been supplied to the SCR's from the first unijunction transistor oscillator circuit. These reset pulses are applied to the base of a transistor which is connected across the first SCR and which has a lower saturation voltage than the SCR, so that upon conduction of the transistor the first SCR is reset. The resultant output voltage is obtained from a voltage divider which is arranged so that the desired voltage level is achieved across the SCR. This voltage divider is formed from three resistors in such a manner that a seperate gating pulse for application to an external circuit is produced concurrently with the production of each voltage level in the staircase wave. Upon refiring of the first SCR by the first firing pulse to follow the reset pulse, a differentiator circuit produces a reset pulse for a second SCR. This SCR is reset in the same manner as the first SCR, but one firing pulse later than the first SCR. Thus, the output voltage is now that which appears across the second SCR, as determined by the voltage divider connected with the second SCR. This voltage level is set at a lower value than the first voltage level. This procedure is continued for the desired number of steps, at which point the second unijunction transistor oscillator produces another reset pulse to again start the sequential resetting of the SCR's and the production of the staircase wave form.

For a better understanding of this invention, reference may be made to the accompanying drawing in which.

Figure 1:
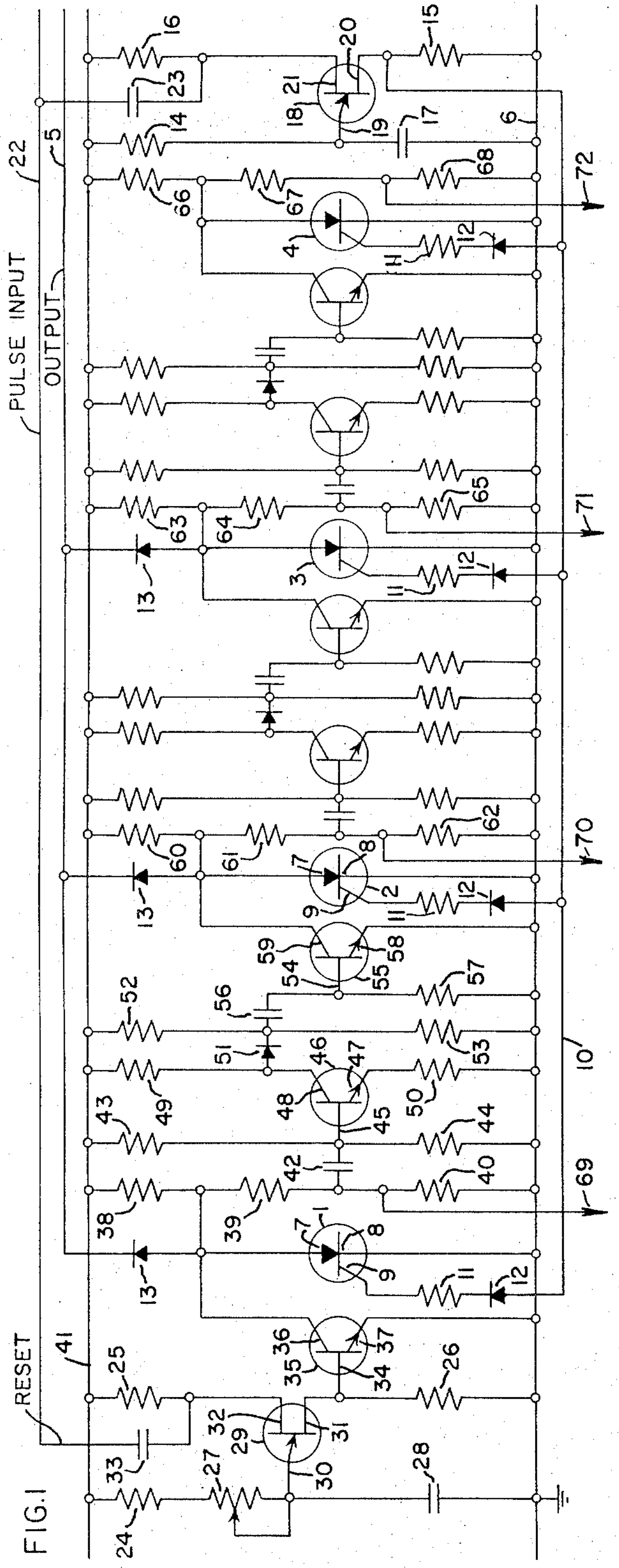
FIGURE 1 is a schematic circuit diagram of the invention.

Referring now to FIGURE 1, voltage controlled breakdown devices such as SCR's 1, 2, 3 and 4 are connected in parallel from the output line 5 to ground line 6. Each of the SCR's has an anode 7, a cathode 8, and a gate 9. Each of the gates 9 is connected to line 10 through a resistor 11 and diode 12. Each of the cathodes 8 of SCR's 1, 2, 3 and 4 is connected directly to ground line 6, while each of the anodes 7 is connected to output line 5 through a diode 13.

Uniformly spaced firing pulses for the SCR's are produced by a first relaxation oscillator circuit including resistors 14, 15 and 16, capacitor 17 and unijunction transistor 18. Unijunction transistor 18 has an emitter 19, a base 20 (base 1) and a base 21 (base 2). A signal composed of negative going uniformly repetitive control pulses is introduced to the circuit on lead 22. The series of pulses is applied to base 21 of unijunction transistor 18 through capacitor 23.

The firing pulses produced at base 20 of unijunction transistor 18 are applied to gates 9 of SCR's 1, 2, 3 and 4 through line 10, resistors 11 and diodes 12. These firing pulses produce simultaneous conduction of the SCR's 1, 2, 3 and 4 and a resultant minimum output voltage level on line 5.

Resetting of SCR 1 is provided by a second unijunction transistor relaxation oscillator including resistors 24, 25, 26, potentiometer 27, capacitor 28 and unijunction transistor 29. Unijunction transistor 29 has an emitter 30, a base 31 (base 1) and a base 32 (base 2). As in the first unijunction transistor oscillator, a signal composed of negative going uniformly repetitive pulses from line 22 is introduced to base 32 of unijunction transistor 29 via capacitor 33. The setting of potentiometer 27 determines the number of firing pulses that will occur before a reset pulse is produced. The produced reset pulse is applied to base 34 of reset transistor 35, which has its collector 36 connected to anode 7 of SCR 1 and its emitter 37 connected to ground line 6. Thus, reset transistor 35 is connected directly across SCR 1. Reset transistor 35 is chosen to have a lower saturation voltage than the saturation voltage of SCR 1 so that upon conduction of transistor 35, SCR 1 will be reset.

When SCR 1 has been reset, a high output voltage level will be present across SCR 1 and will appear on line 5 through diode 13. The magnitude of this output voltage will depend upon the values of resistors 38, 39 and 40, which constitute a voltage divider network connected between line 41, a DC source of power, and ground line 6. The output voltage level is obtained from a point between resistors 38 and 39. A second output, or gating pulse, is obtained from a point between resistors 39 and 40. This gating pulse is useful because it occurs at the same time as the particular voltage level of the staircase wave and, thus, provides a means for synchronization with the staircase wave form. These gating pulses may be supplied to any external circuit.

The gating pulse obtained from the voltage divider including resistors 38, 39 and 40 is applied to a differetiator circuit comprising capacitor 42 and resistors 43 and 44. Resistors 43 and 44 are connected in series between line 41 and ground line 6, while capacitor 42 is connected from the point between resistors 39 and 40 to the point between resistors 43 and 44. The point between resistors 43 and 44 is also connected to base 45 of amplifying transistor 46, which has an emitter 47 and a collector 48. Connected between line 41 and collector 48 of transistor 46 is a resistor 49, while a resistor 50 is connected from emitter 47 to ground line 6. Amplifying transistor 46 acts as an amplifier and phase inverter for the output of the differentiator circuit.

The amplified and phase inverted output of the differentiator circuit is then passed through diode 51, which removes the negative going pulses. The positive going reset pulses then appear at the midpoint of a voltage divider composed of resistors 52 and 53. The reset pulses are applied to a base 54 of reset transistor 55 through capacitor 56. A resistor 57 is connected from base 54 of reset transistor 55 to ground line 6. Reset transistor 55 also has an emitter 58 which is connected to ground line 6, and a collector 59 which is connected to the anode 7 of SCR 2. Transistor 55 serves the same purpose as reset transistor 35 and has a saturation voltage lower than the saturation voltage of SCR 2, so that upon application of a reset pulse to its base 54, it resets SCR 2. Since the firing pulse has already initiated conduction in SCR 1 and thus removed the voltage output from across SCR 1, the resultant output which now appears on line 5 depends solely upon the magnitude of resistors 60, 61, 62 which are connected as a voltage divider network between line 41 and ground line 6.

The same circuit that has just been described between SCR 1 and SCR 2 is repeated between SCR 2 and SCR 3 and between SCR 3 and SCR 4. The resultant output voltage level which occures upon resetting of SCR 3 depends upon the values of resistors 63, 64 and 65. However, the output voltage level upon resetting of SCR 4 is just the minimum voltage level obtained when all SCR's are conducting. SCR 4 and its voltage divider network are provided for the purpose of having a gating pulse, taken from a point between resistors 67 and 68, during this minimum voltage level period.

Figure 2:
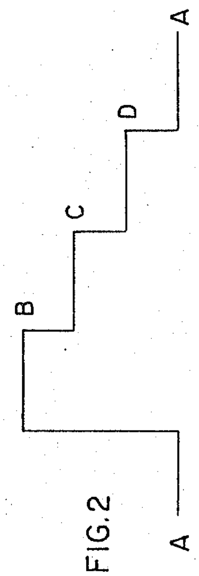
FIGURE 2 is a representation of the wave form produced by this invention.

The operation of the circuit of this invention will now be described with the aid of FIGURE 2. Initially, the DC voltage on line 41 is applied to the first unijunction transistor oscillator circuit. Capacitor 17 is charged through resistor 14, the charging rate depending upon the value chosen for resistor 14. In normal operation, as the capacitor charges to a voltage sufficient to initiate emitter-base conduction in the unijunction transistor 18, there is a discharge of the capacitor 17 through emitter 19 and base 20. However, there is a possibility of frequency variations in the application of this pulse, so the discharge of capacitor 17 is controlled by negative going, uniformly repetitive pulses obtained from line 22 through capacitor 23. These pulses produce a negative voltage on base 21 when the voltage across emitter 19 and base 20 approaches a breakdown value, thereby initating emitter-base conduction, or firing of the unijunction transistor 18, and discharge of capacitor 17, so that the firing pulses appearing at base 20 of unijunction transistor 18 are controlled by pulses from line 22.

The DC voltage from line 41 is also applied across the voltage divider networks comprising resistors 38, 39 and 40; resistors 60, 61 and 62; resistors 63, 64 and 65; and resistors 66, 67 and 68. Upon application of the firing pulses from base 20 of unijunction transistor 18 through line 10, resistors 11 and diodes 12 to the gates 9 of SCR's 1, 2, 3 and 4, conduction is initiated in the SCR's The current path upon conduction of SCR's 1, 2, 3 and 4 is through the top resistor, e.g., resistor 38, of the voltage divider networks and then through the SCR, e.g., SCR 1. Output voltage is obtained on line 5 through diodes 13, which are connected to anodes 7 of SCR's 1, 2 and 3, so that during conduction of SCR's 1, 2 and 3 the output voltage, indicated as level A in FIGURE 2, is only the voltage drop across the SCR's which may be considered to be negligible for practical purposes.

While the firing pulses are being produced, capacitor 28, which is in the second unijunction transistor relaxation oscillator circuit, has been charging. The charging rate of the capacitor is determined by the setting of potentiometer 27, the charging rate here being set so that the unijunction transistor 29 produces a pulse at the same time that the fourth firing pulse is produced. This synchronization of the reset pulse from unijunction transistor 29 and the firing pulse from unijunction transistor 18 is controlled by the uniformly repetitive pulses from line 22, which are applied to unijunction transistor 18 through capacitor 23 and to unijunction transistor 29 through capacitor 33. Upon production of the reset pulse, it is applied to base 34 of transistor 35 to initiate conduction of this transistor. Because transistor 35 has a lower saturation voltage than SCR 1, the low voltage across SCR 1 causes it to reset. Resetting of SCR 1 produces an output voltage level on line 5 which is controlled by the magnitude of resistors 38 and 39 and 40. Since a downward stepping staircase wave is desired, resistors 38, 39 and 40 are arranged to provide the highest desired voltage level as B in FIGURE 2. This voltage is obtained from between resistors 38 and 39 and applied to line 5 through diode 13. The reset pulse is set to have a duration longer than the firing pulses so that SCR 1 is definitely reset until the occurrence of the next succeeding firing pulse. While SCR 1 is reset, a gating pulse is produced between resistors 39 and 40. This gating pulse has the same duration as output voltage level B (see FIGURE 2) and may be used to synchronize external circuits with this portion of the staircase wave. Gating pulses from a point between resistors 39 and 40 are applied to external circuits through lead 69.

Upon occurrence of the next succeeding firing pulse, SCR 1 is refired and the output voltage is immediately removed from line 5. Since a voltage representative of the output voltage level, specifically, the gating pulse from a point between resistors 39 and 40, is applied to the differentiator circuit consisting of capacitor 42 and resistors 43 and 44, a positive pulse is produced upon reset of SCR 1 and a negative pulse upon firing of SCR 1. These pulses are then applied to transistor 46 which amplifies the pulses and phase inverts them, so that the pulse produced upon firing of SCR 1 is now a positive going pulse. The amplified and phase inverted pulses are then applied to base 54 of transistor 55 through diode 51 and capacitor 56. Diode 51 permits only the positive going pulses, produced upon firing of SCR 1, to appear on the base of transistor 55. Transistor 55 has a lower saturation voltage than SCR 2, so that, upon conduction of transistor 55, SCR 2 is reset in the same manner that SCR 1 is reset by conduction of transistor 35. The output voltage which now appears on line 5 depends upon the values of resistors 60, 61 and 62. As this is the second step of the staircase wave, resistors 60, 61 and 62 are arranged to provide a lower voltage output than was obtained from the voltage divider composed of resistors 38, 39 and 40. This level is indicated as C in FIGURE 2. A gating pulse is also produced from a point between resistors 61 and 62. This gating pulse is similar to the one produced from a point between resistors 39 and 40, and is connected to an external circuit through lead 70. The voltage divider networks comprising resistors 38, 39 and 40 and resistors 60, 61 and 62 are arranged so that the gating pulses from a point between resistors 61 and 62 have approximately the same magnitude as the gating pulses from a point between resistors 39 and 40. This is also true for the gating pulses obtained from a point between resistors 64 and 65 and resistors 67 and 68. These latter gating pulses are applied to external circuits through leads 71 and 72, respectively.

The foregoing description applies to each succeeding step of the staircase wave generator. In this particular embodiment, three steps, or four levels, have been utilized, so that the voltage levels A, B, C and D are realized. Of course, a greater or lesser number of steps may be easily accomplished by merely adding or subtracting an SCR and its associated circuitry. For instance, without removing any elements from the circuit a two-step or three level staircase wave could be achieved by disconnecting the diode 13 in series with SCR 3 and setting potentiometer 27 to a value such that a reset pulse is produced upon every third firing pulse, rather than upon every fourth pulse.

The advantages of this system are now apparent. These advantages reside in the fact that it is much easier to obtain constant levels with a resistance voltage divider, rather than with capacitor charging and discharging, and the fact that production of reset pulses for succeeding SCR's upon firing of the preceding SCR provides an inherent system for producing the desired sequence of output voltages. This latter feature is especially desirable as it eliminates the necessity of providing an accurately controllable external circuit for producing sequential firing or resetting.

While this invention has been described with respect to a particular embodiment thereof, it will be understood that the invention is not limited thereto and that many modifications will occur to those skilled in the art. It is therefore desired that the appended claims will cover all modifications included within the spirit and scope of the invention.

What is claimed is:

1. A staircase wave generator comprising:

a plurality of resistances, each having one end connected to a common terminal and the other end connected to a point of unidirectional potential, a plurality of voltage controlled breakdown devices having a pair of output electrodes and a control electrode, each of said devices having the characteristic that upon application of a voltage between the output electrodes and a pulse between the control electrode and an output electrode, electrical conduction occurs between the output electrodes and upon lowering of the potential between the output electrodes below a predetermined value conduction therebetween is terminated, one of said output electrodes of each said voltage controlled breakdown devices connected to an intermediate point on a respective one of said resistances, the other one of each pair of output electrodes connected to said common terminal, means for providing unilateral current conduction from each of said intermediate points to an output terminal, means for applying a train of regularly recurring pulses to each of said voltage controlled breakdown devices to initiate conduction between the output electrodes thereof, a frequency divider responsive to said train of recurring pulses for providing another train of regularly recurring pulses, means responsive to the pulses of said second train for rendering one of said devices nonconductive, circuit means in association with each successive device responsive to a change in state from nonconduction to conduction in a preceding device for rendering said succeeding device nonconductive.

2. A staircase wave generator comprising:

a plurality of resistances, each having one end connected to a common terminal and the other end connected to a point of positive unidirectional potential, a plurality of voltage controlled breakdown devices having an anode, a cathode, and a control electrode, each of said devices having the characteristic that upon application of a voltage between the anode and cathode and a pulse between the control electrode and cathode, electrical conduction occurs between anode and cathode and upon lowering of the potential between anode and cathode below a predetermined value conduction therebetween is terminated, the anode of each of said voltage controlled breakdown devices connected to an intermediate point on a respective one of said resistances and the cathode of each device connected to said common terminal, a plurality of unilaterally conducting devices each having a cathode and an anode, each anode connected to an anode of a respective one of said voltage controlled breakdown devices, the cathodes of said unilaterally conducting devices connected to an output terminal, means for applying a train of regularly recurring pulses to each of said voltage controlled breakdown devices to initiate conduction between the anode and cathode electrodes thereof, a frequency divider responsive to said train of recurring pulses for providing another train of regularly recurring pulses, means responsive to the pulses of said second train for rendering one of said voltage controlled breakdown devices nonconductive, circuit means in association with each successive voltage controlled breakdown device responsive to a change in state from nonconduction to conduction in a preceding device for rendering said succeeding device nonconductive.

3. A staircase wave generator comprising:

a plurality of resistances, each having one end connected to a common terminal and the other end connected to a point of unidirectional potential, a plurality of electronic switching devices, each having a pair of switch terminals, each of said devices have characteristic that upon application of a pulse to a control circuit thereof conduction is established between said pair of terminals and upon application of another pulse to another control circuit thereof conduction between said pair of terminals is terminated, one terminal of each of said devices connected to an intermediate point on a respective resistance and the other terminal connected to said common terminal, means for providing unilateral current conduction from each of said intermediate points to an output terminal, means for applying a train of regularly recurring pulses to each of said devices to initiate conduction between the switch terminals thereof, a frequency divider responsive to said train of recurring pulses for providing another train of regularly recurring pulses, means responsive to the pulses of said second train for rendering one of said devices nonconductive, circuit means in association with each successive device responsive to a change in state from nonconduction to conduction in a preceding device for rendering said succeeding device nonconductive.

References Cited

UNITED STATES PATENTS

| | | | |
|---|---|---|---|
| 2,858,434 | 10/1958 | Tollefson | 328—186 |
| 3,165,646 | 1/1965 | De Bottari et al. | 307—88.5 |
| 3,237,029 | 2/1966 | Cosby | 307—88.5 |

JOHN S. HEYMAN, *Primary Examiner.*

ARTHUR GAUSS, *Examiner.*